US005592726A

United States Patent [19]
Suresh

[11] Patent Number: 5,592,726
[45] Date of Patent: Jan. 14, 1997

[54] AXIAL SWAGE TOOL HAVING A STABILIZING PIN

[75] Inventor: Srinivas B. Suresh, Irvine, Calif.

[73] Assignee: The Deutsch Company, Santa Monica, Calif.

[21] Appl. No.: 369,794

[22] Filed: Jan. 6, 1995

[51] Int. Cl.$^6$ .......... B23P 19/04
[52] U.S. Cl. .......... 29/237; 29/434; 29/249; 29/520; 29/252; 29/282; 72/453.02
[58] Field of Search .......... 29/237, 249, 282, 29/252, 283.5, 520, 434; 72/453.02

[56] References Cited

U.S. PATENT DOCUMENTS

| | | | |
|---|---|---|---|
| 539,573 | 5/1895 | Cartwright . | |
| 1,085,461 | 1/1914 | Michaselis . | |
| 1,350,904 | 8/1920 | Walters . | |
| 2,328,747 | 9/1943 | Schweidler . | |
| 3,143,790 | 8/1964 | Over et al. . | |
| 3,280,864 | 10/1966 | Spanenberg . | |
| 3,299,496 | 1/1967 | Christensen . | |
| 3,474,519 | 10/1969 | Hallesy | 29/432 |
| 3,579,794 | 5/1971 | Powell | 29/237 |
| 3,585,704 | 6/1971 | Schroeder . | |
| 3,599,310 | 8/1971 | Brownlee . | |
| 3,726,122 | 4/1973 | Dawson | 72/412 |
| 3,727,289 | 4/1973 | Bemelmann et al. | 29/237 |
| 3,777,354 | 12/1973 | Masters . | |
| 3,779,587 | 12/1973 | Racine | 285/312 |
| 4,170,125 | 10/1979 | Minka . | |
| 4,189,817 | 2/1980 | Moebius | 29/237 |
| 4,257,135 | 3/1981 | Moebius . | |
| 4,345,361 | 8/1982 | Baumann | 29/237 |
| 4,447,077 | 5/1984 | Palmer | 285/104 |
| 4,483,056 | 11/1984 | Schwalm et al. . | |
| 4,559,691 | 12/1985 | Mannhart et al. | 29/283.5 |
| 4,809,418 | 3/1989 | Burli | 29/237 |
| 5,297,325 | 3/1994 | Thelen | 29/237 |
| 5,305,510 | 4/1994 | Croft et al. | 29/237 |
| 5,398,394 | 3/1995 | Hyatt et al. | 29/237 |

FOREIGN PATENT DOCUMENTS

| | | |
|---|---|---|
| 2032444 | 1/1972 | Germany . |
| 28769 | 1/1933 | Netherlands . |

OTHER PUBLICATIONS

Bulletin 1674 entitled "Rynglok Fitting System" by Aeroquip Linair Division, year 1987, total 8 pages.
Advertisement entitled "The Lokring Pipe and Tube Joining System" produced by Lokring Corporation, total 2 pages.
Two sheets of drawings showing Deutsch axial swaging tool with single slot and clamped cap (one sheet dated Sep. 22, 1994).
Deutsch New Product Brochure for Permalite Connections (Aug. 1992).

*Primary Examiner*—Irene Cuda
*Assistant Examiner*—Marc W. Butler
*Attorney, Agent, or Firm*—Pretty, Schroeder, Brueggemann & Clark

[57] ABSTRACT

A swaging tool for swaging a fitting to a tube includes a tubular housing having a first jaw unit on a first end portion of the housing and a closed cylinder at a second end portion of the housing. The closed cylinder has a port for receiving pressurized fluid. A ram is movable in opposite axial directions in the closed cylinder of the housing. A piston having a second jaw unit is located in a middle portion of the housing in engagement with the ram. A stabilizing pin is slideably received through the piston and into the ram. Bearings are located on an end of the stabilizing pin and on the ram to react the moments generated during swaging directly into the housing.

14 Claims, 6 Drawing Sheets

FIG. 1
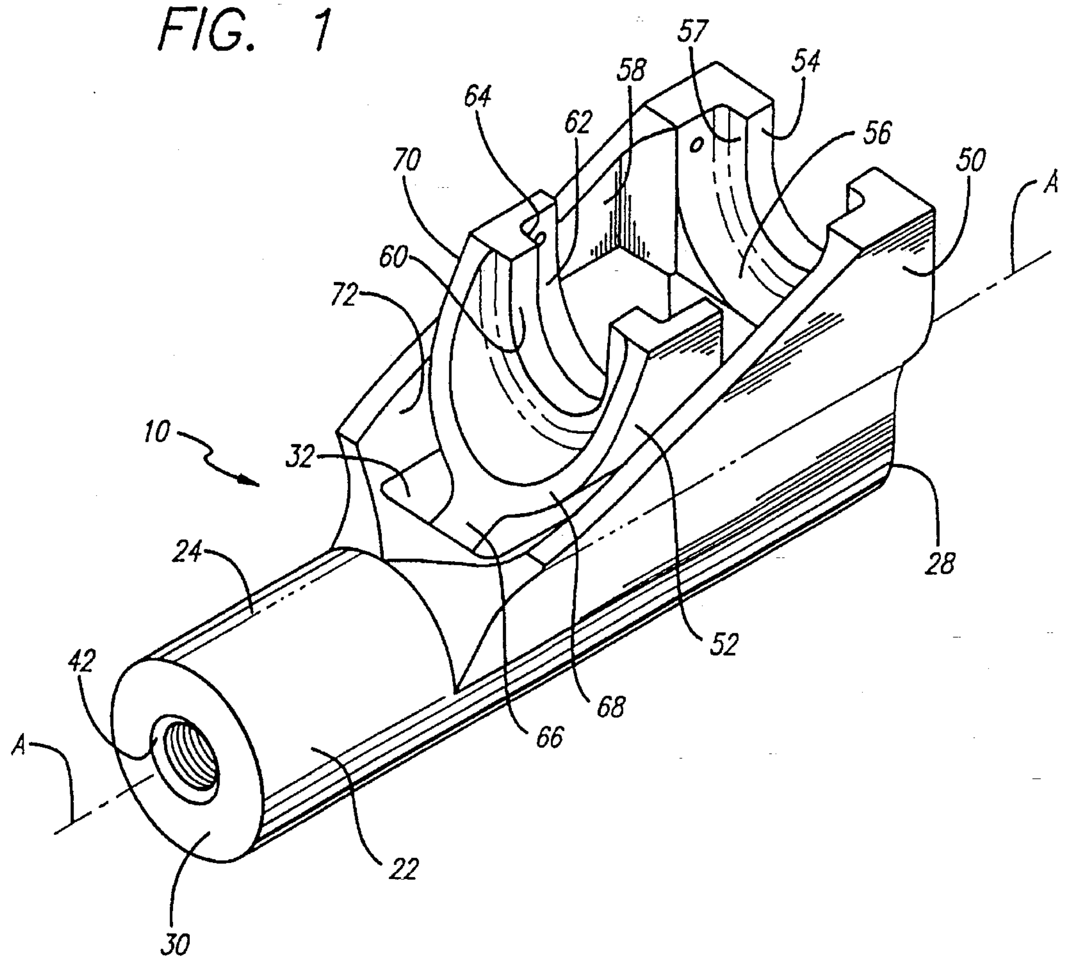
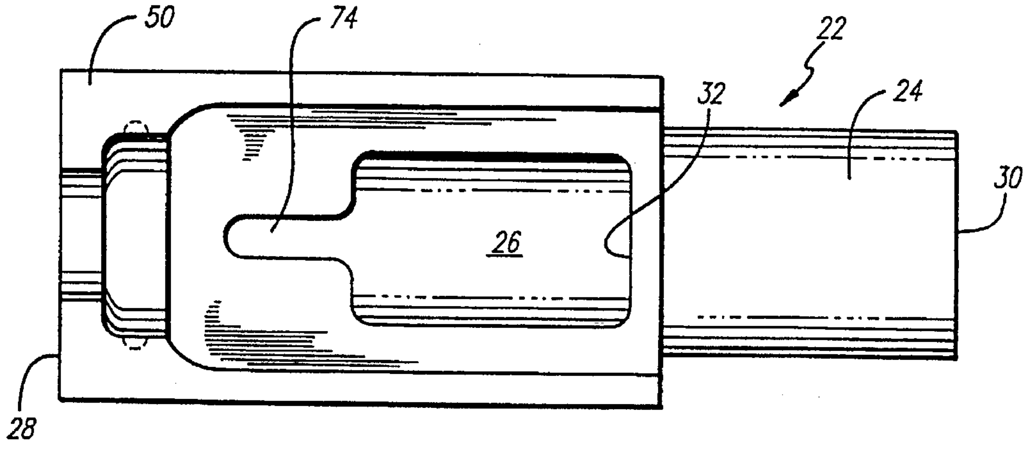
FIG. 3

FIG. 6
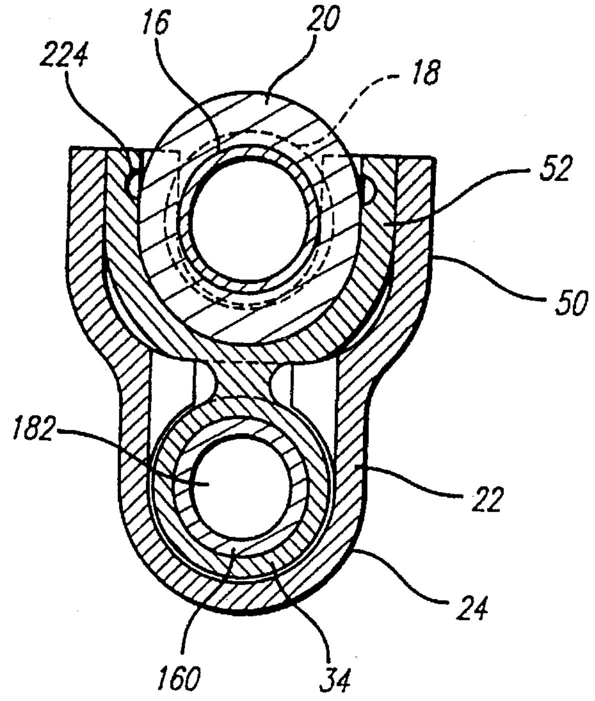
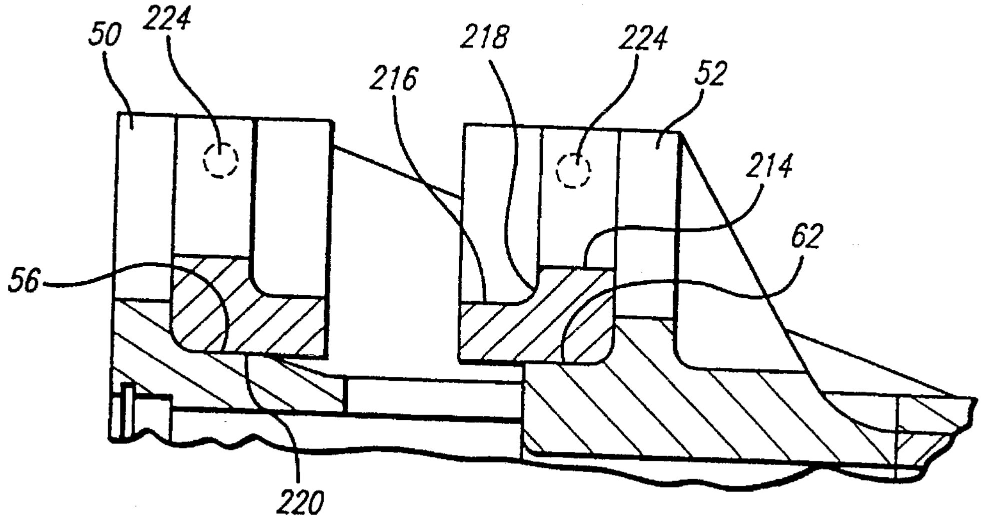
FIG. 8

FIG. 7A
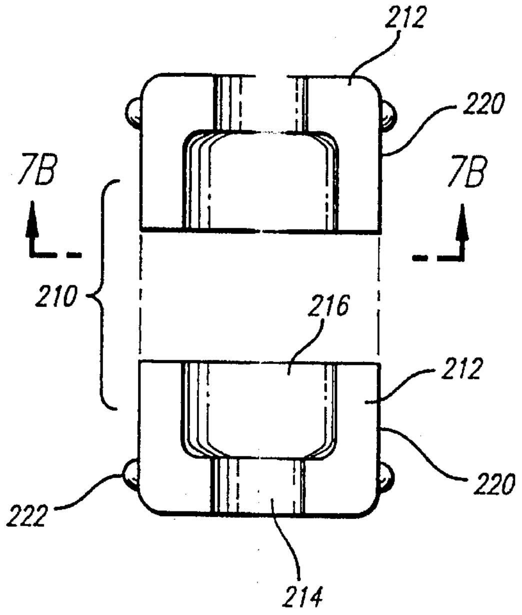
FIG. 7C
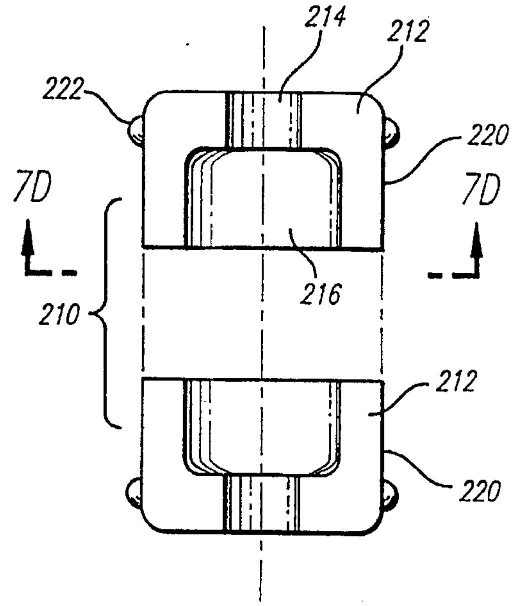
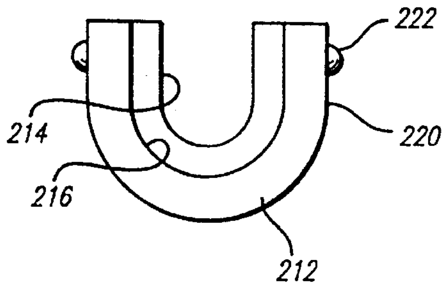
FIG. 7B
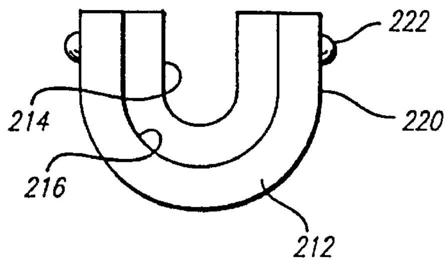
FIG. 7D

AXIAL SWAGE TOOL HAVING A STABILIZING PIN

This invention relates to swaging tools for use in swaging fittings and, more particularly, to a swaging tool for swaging axially swaged fittings, to join tubes or pipes.

BACKGROUND OF THE INVENTION

Swaged fittings have been used for many years to connect tubes and pipes in various types of fluid systems, including those used in the aircraft, marine, petroleum and chemical industries. A tube end is inserted into a fitting, usually in the form of a cylindrical sleeve, and then the fitting is swaged with a swaging tool to produce a fluid-tight connection around the tube. This swaging operation usually is carried out by applying a radial force which radially compresses the fitting and tubing inwardly. This radial force may be applied directly by the swaging tool or indirectly by a specially shaped ring which is moved axially by the swaging tool to apply a radial force to the fitting. The invention of the present application is directed to the latter type of swaging tool designed for use with fittings having axially movable swaging rings. These fittings shall be referred to as axially swaged fittings.

Typical axially swaged fittings comprise a cylindrical sleeve having openings at opposite ends for receiving the ends of two tubes to be connected, with a swaging ring at each end of the sleeve. The outer surface of the sleeve and the inner surface of the swaging ring which contact each other are shaped such that axial movement of the swaging ring over the sleeve applies a radial force to the sleeve and, thus, to the tubes. Although not all fittings employ a sleeve with two swaging rings, the use of two swaging rings is necessary when it is desired, as is often the case, to join two tubes to each other.

One type of swaging tool for axially swaged fittings is described in U.S. Pat. No. 5,398,394 issued on Mar. 21, 1995, which is incorporated herein by reference. The tool includes a housing having an inner surface and an outer surface, and a piston that is movable in opposite axial directions within the housing. The piston has a cylindrical outer surface in axial sliding engagement with the inner surface of the housing. The housing has a closed end and an open end. The open end is threaded and connected to a threaded cap, which encloses the piston within the housing. The cap is connected to a source of hydraulic pressure for selectively moving the piston axially within the housing. A first engaging member is formed on the outer surface of the housing adjacent to the closed end for engaging one of the ring or the sleeve of the fitting to restrain it from axial movement. A second engaging member is formed on the outer surface of the piston for engaging the other one of the ring or the sleeve to move it in an axial direction toward the first engaging member upon movement of the piston toward the closed end of the housing.

While the above-described swaging tool works quite well, it does have its disadvantages. In particular, the housing is slotted to accommodate axial movement of the piston and second engaging member. Therefore, additional parts, such as a support ring to support the threaded end of the housing during swaging, are often necessary to maintain the structural integrity of the swaging tool. Also, the threaded cap requires occasional tightening, which increases the maintenance requirements of the device.

Another type of axial swaging tool is described in U.S. Pat. No. 4,189,817 to Moebius. This tool also includes a housing having a cylinder that receives a piston. A screw threaded end closure having a pressure fluid inlet closes the end of the cylinder. A movable jaw unit is received on a guide shaft extending axially from the piston and a fixed jaw unit is mounted to the housing in confronting relationship to the movable jaw unit. A slide arm mounted to the movable jaw unit extends parallel to the cylinder and engages a longitudinal bearing surface on the outside of the cylinder to counteract deflection of the movable jaw unit during a swaging operation. The location of the slide arm along the outside of the cylinder, however, actually aggravates the deflection problem because it significantly increases the distance between the force generating axis (i.e., the piston axis) and the force application axis (i.e., the fitting axis), which, in turn, increases the bending moment on the movable jaw. In addition, as with the swaging tool described above, the threaded end cap requires occasional tightening and therefore increased maintenance of the tool.

Another axial swaging tool is described in U.S. Pat. No. 5,305,510 to Croft et al. In this tool, the hydraulic cylinder appears to be capless. Therefore, it would not have the maintenance requirements described in connection with the above devices. However, in this case, the movable jaw unit is mounted to the piston by a threaded fastener, which itself requires tightening. In addition, the movable jaw unit includes a pad that extends parallel to the cylinder and engages a longitudinal bearing surface on the outside of the cylinder. This pad, like the slide arm in the Moebius patent, increases the bending moment on the movable jaw because it increases the distance between the piston axis and the fitting axis.

A further axial swage tool is described in U.S. Pat. No. 4,345,361 to Baumann, which appears to show another capless hydraulic cylinder. It is unclear, however, how the tool is assembled.

In view of the above, it should be appreciated that there is still a need for an axial swaging tool that has fewer maintenance requirements, is lighter in weight, and is more reliable in service. The present invention satisfies these and other needs and provides further related advantages.

SUMMARY OF THE INVENTION

The present invention is embodied in an axial swaging tool having a drop-in movable jaw unit and a stabilizing pin that effectively counters deflection forces on the movable jaw unit during a swaging operation. The design of the tool, in combination with other features described below, contributes to a balanced swaging tool that is extremely compact and lightweight. The swaging tool of the present invention furthermore is simple to operate, reliable in use, relatively inexpensive to manufacture and low in maintenance.

The swaging tool includes a tubular housing having a first end portion, a second end portion defining a closed cylinder and a port for providing pressurized fluid and a middle portion between the end portions. A ram is located within the closed cylinder of the housing and a piston is movable into engagement with the ram. A fixed jaw unit is located on the first end portion of the housing and a movable jaw unit is located on the piston.

An important feature of the present invention is that a pin or piston rod is inserted through the piston and into the ram to stabilize the piston and ram within the housing. In addition, bearings are located on the outside of the ram and on an end portion of the stabilizing pin to react the moments generated during swaging directly into the housing and to reduce undesirable deflection or cocking of the movable jaw unit during swaging. The pin and bearings also permit smooth movement of the piston and ram within the housing.

Another feature of the present invention is that the second end portion of the housing is a closed cylinder, i.e., it is not slotted longitudinally through to the end as in prior swaging tools. Such a closed cylinder design improves the structural integrity of the swaging tool. To facilitate assembly, the middle portion of the housing is provided with a cutout to permit radial access of the piston to the interior of the housing. This configuration advantageously provides a modular design wherein the components fit together and cooperate to provide an extremely compact and lightweight swaging tool.

The unique modular design of the tool, including the use of a cutout in the tool housing, the location and type of bearings, and the use of a separate stabilizing pin, advantageously allows a minimum displacement of the force generating axis (i.e., along the piston axis) from the force application axis (i.e., along the fitting axis). As a result, the internal tool deflection and stresses are reduced. This translates to and enables a reduction in the tool's size and weight.

Another feature of the present invention is that the cylinder may be capless. Therefore, the chances of an end cap being loosened during swaging, or the requirement of tightening the end cap before swaging is eliminated. Such a capless design is more rugged and self-contained, and is safer during the swaging operation.

A further feature of the invention is interchangeable adapters that enable the swage tool to be used for more than one size fitting. The adapters are fastened to the jaws and therefore may be readily substituted to accommodate different size fittings.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 1 is a perspective view of an axial swaging tool embodying the features of the present invention.

FIG. 3 is a top view of a housing for the axial swaging tool, taken along line 3—3 of FIG. 2.

FIG. 6 is a cross-sectional, elevation view of the axial swaging tool, taken substantially along line 6—6 of FIG. 4.

FIGS. 7A is a top view of an adapter for the axial swaging tool of the present invention. FIG. 7B is an end view of the adapter, taken along line 7B—7B of FIG. 7A. FIG. 7C is a top view of a different-sized adapter. FIG. 7D is an end view taken along line 7D—7D of FIG. 7C. The adapter shown in FIGS. 7A and 7B is for a larger fitting, whereas the adapter shown in FIGS. 7C and 7D is for a smaller fitting.

FIG. 8 is a cross-sectional, elevation view of a portion the axial swaging tool of the present invention with adapters mounted to the jaws of the tool.

DETAILED DESCRIPTION OF THE PREFERRED EMBODIMENT

Figure 2:
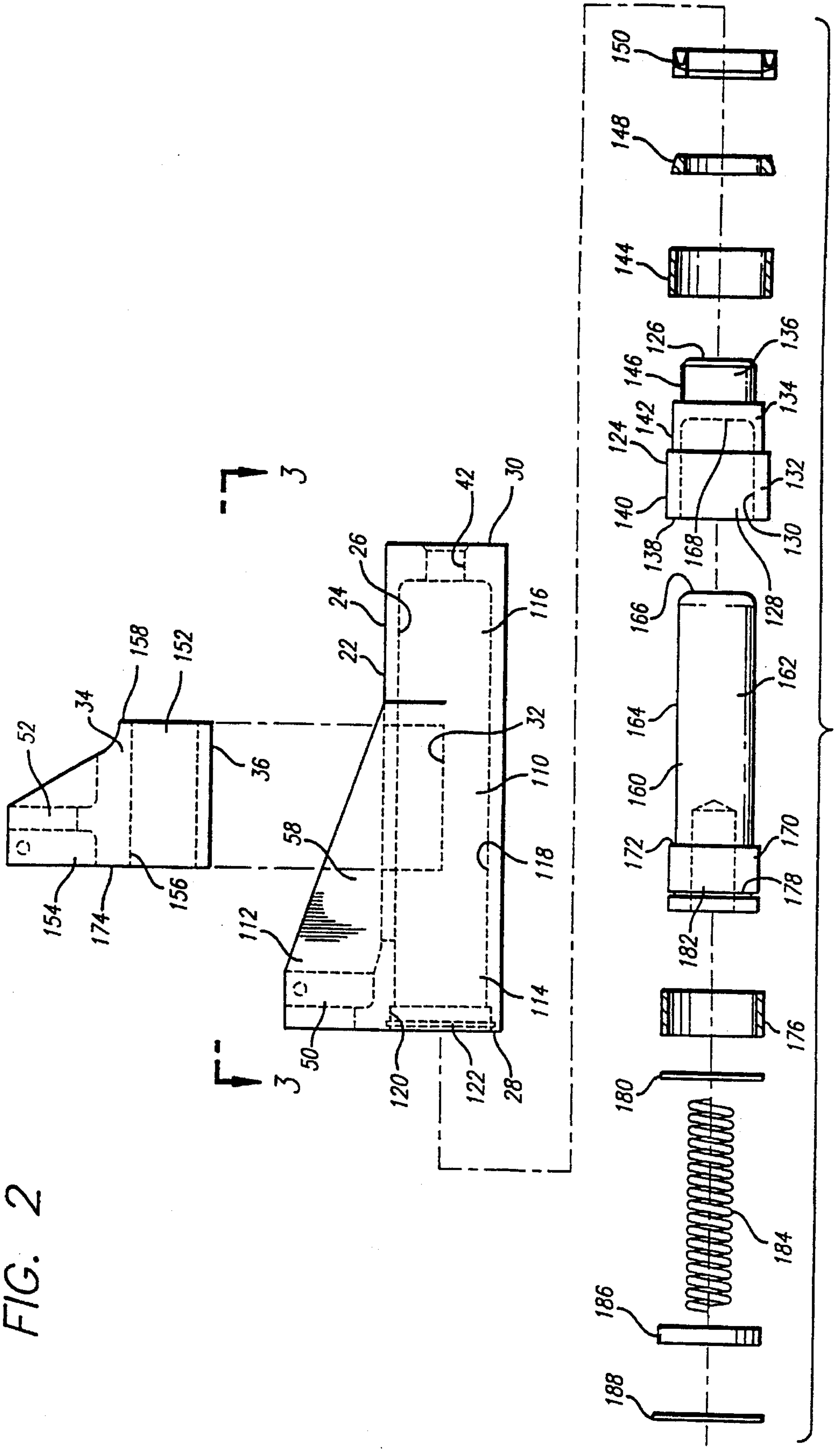
FIG. 2 is an exploded assembly view of the axial swaging tool of the present invention.
Figure 4:
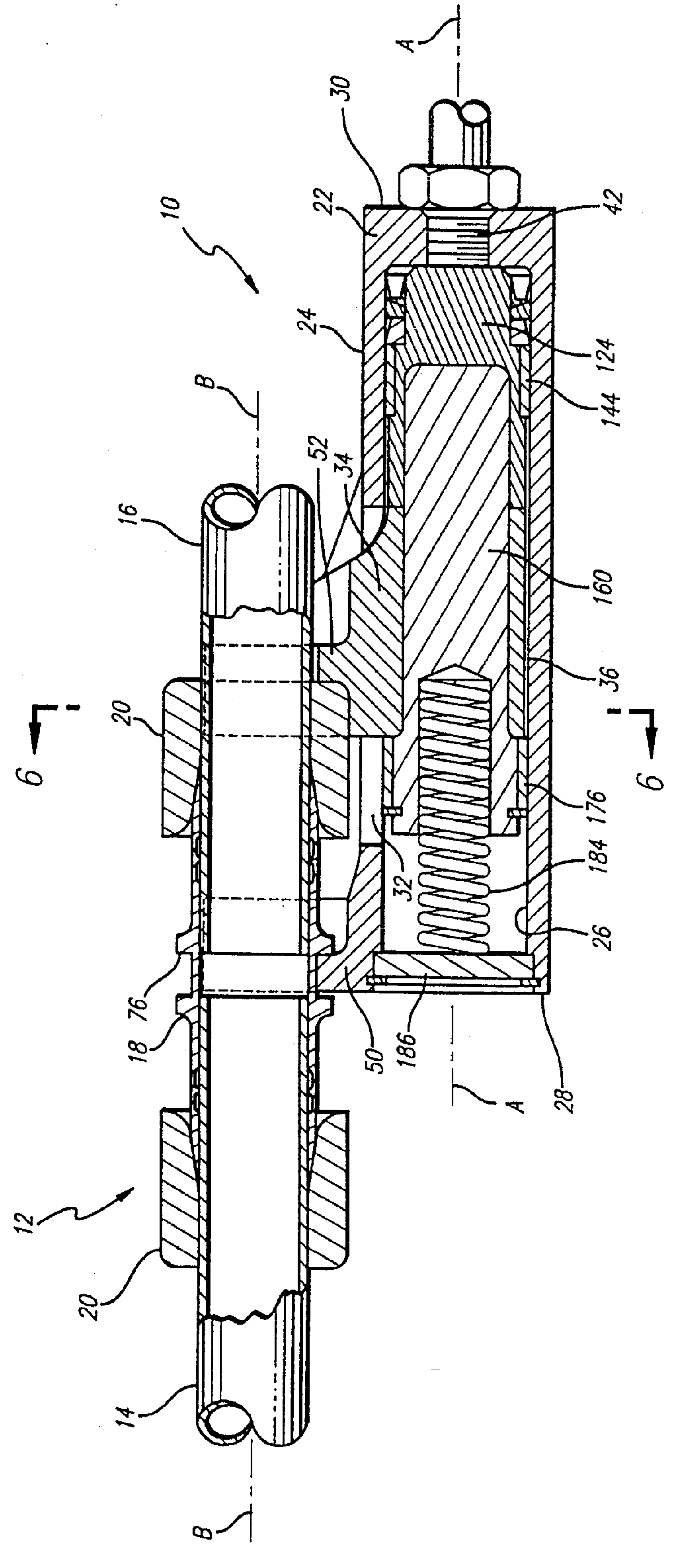
FIG. 4 is a cross-sectional, elevation view, showing the axial swaging tool in position prior to swaging a fitting.
Figure 5:
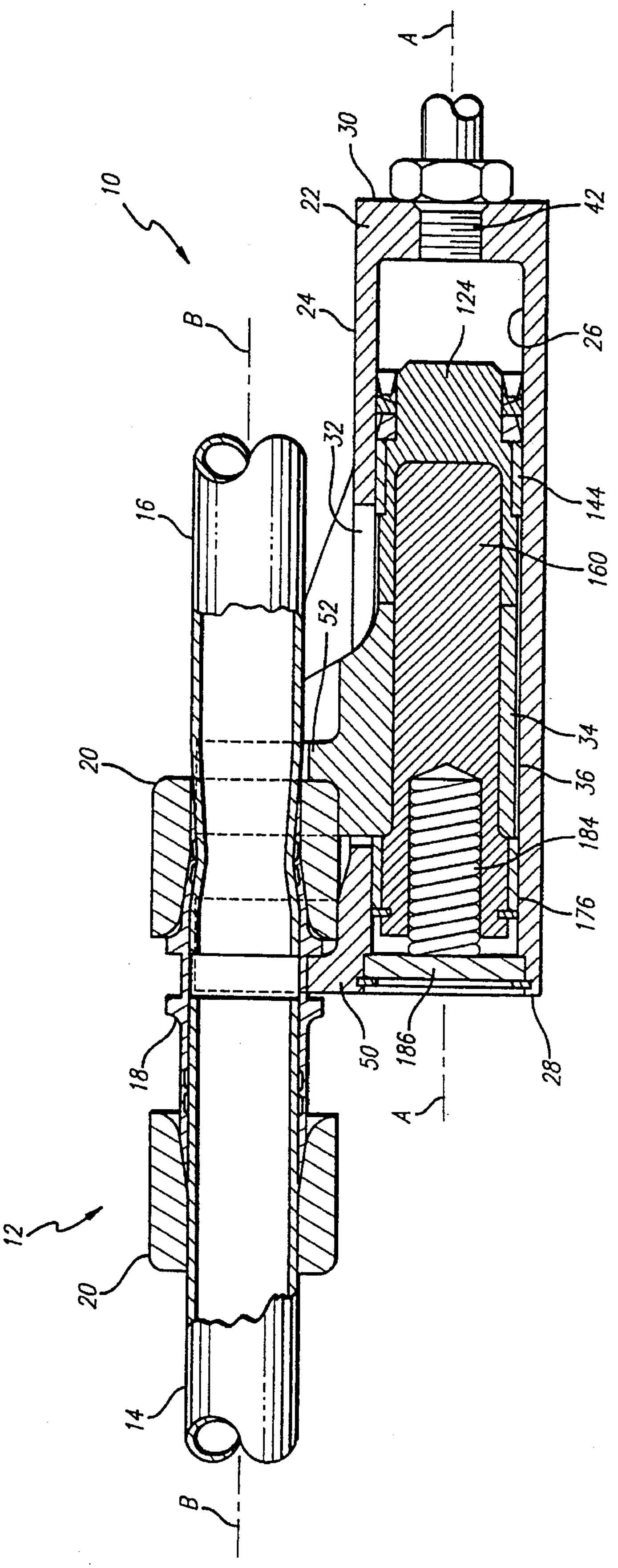
FIG. 5 is a cross-sectional, elevational view, similar to FIG. 4, showing the axial swaging tool after the fitting has been swaged.

As shown in the accompanying drawings, the present invention is embodied in a swaging tool, indicated generally by the reference numeral 10, for use in swaging a fitting 12 and joining two tubes 14 and 16 together (see FIGS. 4–5). The tool is especially adapted for swaging fittings of the type having a cylindrical sleeve 18 with a tapered outer surface and a cylindrical inner surface for receiving the tube 14 or 16. A swaging ring 20 surrounds the sleeve 18 and has an inner surface which matches and engages with an outer surface of the sleeve 18. Before swaging, the swaging ring 20 is positioned outwardly with respect to the sleeve 18 such that no radial force is applied by the swaging ring to the sleeve (FIG. 4). During swaging, the swaging ring 20 is moved axially in a forward direction over the sleeve 18 such that the interaction of the tapered surfaces on the ring and the sleeve applies a radial force deforming the sleeve 18 and tube 14 or 16 inwardly to make a swaged connection between them (FIG. 5). These fittings shall be referred to generally as axially swaged fittings. It will be appreciated, however, that other configurations of the contacting surfaces between the fitting 18 and the ring 20 are possible, since the operation of the tool 10 is independent of these configurations.

With reference to FIGS. 1, 4 and 5, the tool 10 comprises a tubular housing 22 having a substantially cylindrical outer surface 24 and a substantially cylindrical inner surface 26. The housing 22 has a first end 28 that is open, a second end 30 that is closed and a cutout 32 that permits radial access to the interior of the housing. A piston 34 having a cylindrical outer surface 36 is movable in opposite axial directions within the housing 22. Longitudinal axis A defines the piston axis which is typically coaxial with the housing's cylindrical inner surface 26. The closed end 30 of the housing 22 includes a port 42 for connection to a source of hydraulic pressure (e.g., 10,000 psi oil pressure) such that, when pressure is introduced through the port 42, it moves the piston toward the first end 28 of the housing 22.

Two jaw units are provided on the housing 22 and the piston 34 for moving the swaging ring 20 over the sleeve 18 to thereby swage the fitting 12 to the tube 14 or 16. In one preferred embodiment, these jaw units comprise an outer yoke 50 formed on the outer surface 24 of the housing 22 and an inner yoke 52 formed on the outer surface 36 of the piston 34. Each of these yokes 50 and 52 may be adapted to engage the ring 20 or the sleeve 18 to cause axial movement of the swaging ring over the sleeve to swage the fitting 12.

With reference to FIG. 1, the outer yoke 50 has a substantially U-shape that is stepped in the longitudinal direction to provide first and second support surfaces 54 and 56 extending in the longitudinal direction. The support surfaces are separated by a bearing surface 57 extending in the radial direction relative to the axis A. In order to support the outer yoke 50 and to prevent its breakage during the swaging operation in which extremely high forces are generated, two spaced apart stabilizing buttresses 58 are connected between the yoke 50 and the outer surface 24 of the housing 22.

The inner yoke also has a substantially U-shape that is stepped in the longitudinal direction to provide first and second support surfaces 60 and 62 extending in the longitudinal direction. The support surfaces are separated by a bearing surface 64 extending in the radial direction relative to the axis A. Preferably, the inner yoke is connected to the outer surface 36 of the piston 34 by a Y-shaped flange having a lower buttress 66 that extends outward from the outer surface 36 of the piston and upper buttresses 68 that flair out laterally and extend longitudinally to support and stabilize the inner yoke. In the preferred embodiment, outer surfaces 70 of upper buttresses 68 are configured to slidably engage inner surfaces 72 of the stabilizing buttresses 58 for the outer yoke (see FIG. 6). This arrangement prevents any significant rotation of the inner yoke about the axis A. The cutout 32 may also be provided with a narrow slot 74 extending toward the first end 28 of the housing (see FIGS. 3 and 6) to further resist rotational movement of the inner yoke as the swaging operation nears completion.

With reference to FIGS. 2 and 4–6, the components of the axial swaging tool of the present invention and their assembly will be described in more detail. The housing 22 includes a tubular portion 110 and a first jaw unit 112. The tubular portion includes the cylindrical outer and inner surfaces 24, 26 referred to above. The first jaw unit includes the outer yoke 50 and the stabilizing buttresses 58 referred to above.

The tubular portion 110 further comprises a first end portion 114 at the first end 28 of the housing, a second end portion 116 at the second end 30 of the housing, and a middle portion 118 between the end portions. The first end portion 114 has a counterbore 120 and an annular slot 122 immediately adjacent the counterbore between the counterbore and the first end 28 of the housing. Below the outer yoke 50, the first end portion 114 is preferably a closed cylinder, i.e., the cylinder wall is not slotted longitudinally through to the first end 28. This provides improved strength for resisting the loads placed upon the outer yoke during swaging. The second end portion 116 of the housing forms a closed cylinder for receiving the pressurized fluid from the port 42 through the second end 30 of the housing. The middle portion 118 defines the cutout 32. Preferably, the cutout is only as wide as is necessary to receive the piston 34 and is only as long as is necessary to permit a complete swaging operation, i.e., the cutout is long enough to permit the inner yoke 52 to travel from a start position in the swaging operation (shown in FIG. 4) to an end position in the swaging operation (shown in FIG. 5).

Located in the second end portion 116 of the housing is a ram 124. The ram has a closed end forming a head 126 that faces the second end 30 of the housing. When pressurized fluid is introduced through the port 42, it acts against the head of the ram, moving the ram toward the first end 28 of the housing. The ram also has an axial bore 128 opposite its closed end and an interior cylindrical surface 130.

Preferably, the outside of the ram is tiered having first, second and third portions 132, 134, 136, respectively. The first portion is at the end of the ram having the axial bore 128 and includes an end surface 136 and a cylindrical exterior surface 140 facing the inner surface 26 of the housing. The second portion 134 includes a cylindrical exterior surface 142 having a smaller diameter than the exterior surface 140 of the first portion of the ram. Preferably, an annular slide bearing 144 is disposed between the second portion 134 of the ram and the inner surface 26 of the housing. The third portion 136 includes the head 126 of the ram and has a cylindrical exterior surface 146 having a smaller diameter than the exterior surface 142 of the second portion 134. Preferably, a metal seal ring 148 and a seal 150 are located between the third portion of the ram and the inner surface 26 of the housing to prevent the leakage of pressurized fluid toward the first end 28 of the housing. The seal ring prevents tilting loads being applied to the seal. It will be appreciated that the ram may be placed in the second end portion 116 of the housing either by inserting it through the first end 28 of the housing or dropping it into the middle portion 118 of the housing through an appropriately sized cutout.

The piston 34 includes a tubular portion 152 and a second jaw unit 154. The tubular portion includes the cylindrical outer surface 36 referred to above, a cylindrical inner surface 156 and an end surface 158 that is in contacting alignment with the ram's end surface 138 when the tool is assembled. The second jaw unit 154 includes the inner yoke 52 referred to above.

A stabilizing pin 160 includes an elongated portion 162 having a cylindrical exterior surface 164 that slideably engages the inner surface 156 of the piston and the interior surface 130 of the ram 124. Preferably, the stabilizing pin has an end wall 166 that engages an inner wall 168 of the ram when assembled and an enlarged end portion 170 opposite the end wall 166, defining a shoulder 172 that engages a second end surface 174 of the piston 34 when assembled. Located on the enlarged end portion 170 of the stabilizing pin is another annular slide bearing 176. An annular slot 178 in the enlarged end portion receives a retaining ring 180 that prevents the bearing 176 from sliding off the end of the stabilizing pin.

The axial swaging tool is assembled by placing one of the slide bearings 144, the seal ring 148 and the seal 150 onto the ram 124 and placing the ram into the second portion 116 of the housing. The piston 34 is then dropped into the housing through the cutout 32 in the housing's middle portion 118. The other bearing 176 is then placed on the enlarged end portion 170 of the stabilizing pin 160, the retaining ring 180 is snapped into the pin's annular slot 178 and the assembly is inserted through the first end 28 of the housing. The elongated portion 162 of the stabilizing pin is inserted through the tubular portion 152 of the piston and into the axial bore 128 of the ram. The end of the stabilizing pin closest to the first end 28 of the housing may be provided with an axial bore 182 which receives one end of a spring 184. A plug 186 may then be placed into the counterbore 120 of the housing into contact with the other end of the spring 184. The plug may be secured in place by a retainer ring 188 that is snapped into the annular slot 122 of the housing. The spring thus biases the stabilizing pin, the piston and the ram away from the plug.

With reference to FIGS. 4–5, an operator may swage one side of the fitting 12 by, for example, engaging a groove 76 on the sleeve 18 with the outer yoke 50, which is stationary, to restrain the sleeve 18 from movement during swaging. The inner yoke 52 is then positioned in engagement with the outer end of the swaging ring 20. When pressure is supplied through the port 42, the ram 124 and piston 34 are moved toward the first end 28 of the housing 22, compressing the spring 184 and moving the swaging ring 20 over the sleeve 18 and swaging the sleeve to the tube 16. At the end of the swaging operation, the pressure source is relieved and the spring 184 returns the piston 34 and the ram 124 toward the second end 30 of the housing and thereby separates the inner yoke 52 from the outer yoke 50. This returns the tool 10 to the ready position for the next swaging operation.

It will be appreciated that during a swaging operation, the inner yoke 52 will develop a bending moment due to the displacement of the force generating axis (i.e., along the piston axis A) from the force application axis (i.e., along a fitting axis B). The stabilizing pin 160 effectively resists the deflection or cocking of the inner yoke due to this bending moment by transferring the load directly into the housing through the slide bearings 144, 176 on each side of the piston 34. Notably, placing the slide bearings inside the housing minimizes the distance between the piston axis A and the fitting axis B, which significantly reduces the bending moment generated during swaging. Although individual annular slide bearings are described in the preferred embodiment, it is contemplated that the enlarged end portion 170 of the stabilizing pin and the exterior surface 140 and/or 142 of the ram may themselves serve as bearings.

With reference now to FIGS. 1, 7A–7D and FIG. 8, adapters may be secured to the outer yoke 50 and the inner yoke 52 to accommodate fittings of different sizes. A different sized adapter set 210 is required for each size fitting. For example, the adapter set in FIGS. 7A and 7B is for a larger size fitting than the adapter set in FIGS. 7C and 7D. Each adapter set may include two identical fitting engagement jaws 212, each jaw having a substantially U-shape that is stepped to provide first and second support surfaces 214, 216 separated by a shoulder 218. An outer surface 220 of each jaw has a U-shape that is dimensioned to be received on the support surface 56 of the outer yoke and/or the support surface 62 of the inner yoke. The jaws may be secured to the yokes by spring-loaded ball detents 222 that are located in the engagement jaws 212 of the adapters. The ball detents 222 are received in holes 224 in the support surfaces 56, 62 of the outer and inner yokes, respectively. The first and second support surfaces 214, 216 of the adapter jaws are dimensioned as desired to receive a particular size fitting. For example, the adapter set in FIGS. 7A and B receive a larger size fitting on surface 214 (e.g. ½ inch) than the adapter set in FIGS. 7C and 7D (e.g. ¼ inch). Instead of ball detents, the adapter jaws may be secured to the yokes by fasteners, e.g., fasteners passing radially through support surfaces 214 into the yokes.

Most of the components of the tool 10 are manufactured from bar stock and may be forged, cast or machined into their various shapes. Preferred materials for the housing 22 include stainless steel, such as PH 13-8 MO stainless steel. Preferred materials for the piston 34, ram 124 and stabilizing pin 160 include stainless steel, such as PH 17-4 MO stainless steel. The slide bearings are preferably composite (such as TLM-PTFE sold under the trade name ORKOT by Tristar Plastics) or may be made from oil impregnated high strength powdered metal to reduce the need to constantly relubricate the tool. The seal ring may be an aluminum bronze material for strength and the seal is preferably made of flurotrel or polyurethane.

From the foregoing, it will be appreciated that the swaging tool of the present invention provides a swaging tool of greatly reduced size and weight, which results in a more simplified swaging operation. The small and lightweight nature of the tool helps reduce operator fatigue and increases productivity. The tool has few maintenance requirements and the readily interchangeable adapters enable the tool to be used for more than one size fitting. These and other advantages give the swaging tool of the present invention a definite advantage in today's aircraft and aerospace designs, as well as those in the marine, petroleum, chemical and construction industries.

While a particular form of the invention has been illustrated and described, it will be apparent that various modifications can be made without departing from the spirit and scope of the invention. Accordingly, it is not intended that the invention be limited, except as by the appended claims.

I claim:

1. A swaging tool for swaging a fitting to a tube, the swaging tool comprising:

a tubular housing having a first end, a second end, an interior, an interior surface, a first end portion that is open at the first end, a second end portion at the second end defining a closed cylinder having a port for receiving pressurized fluid, and a middle portion between the first and second end portions;

a first jaw unit on the first end portion of the housing;

a ram movable in opposite axial directions in the cylinder of the second end portion of the housing, the ram having an interior surface defining a bore;

a piston movable in opposite axial directions in the middle portion of the housing and into engagement with the ram, the piston having an interior surface;

a second jaw unit on the piston, which moves toward the first jaw unit upon movement of the piston in a first axial direction within the housing;

a stabilizing pin slidably received through the piston and into the bore of the ram, the stabilizing pin having a first end portion located between the first end of the housing and the piston and an elongated portion having an exterior surface engaging the interior surfaces of the ram and the piston; and the ram and the first end portion of the stabilizing pin each having bearing means for reacting moments generated by the second jaw unit during swaging directly into the housing.

2. The swaging tool of claim 1, wherein the middle portion of the housing defines a cutout to permit radial access to the interior of the housing and the piston is insertable through the cutout such that the interior surface of the piston may be engaged by the elongated portion of the stabilizing pin.

3. The swaging tool of claim 2, wherein the ram is insertable through the cutout so that it may be positioned fully within the closed cylinder of the housing.

4. The swaging tool of claim 1, wherein the ram has a radially disposed annular surface at one end and the piston has a radially disposed annular surface in contacting alignment with the radially disposed annular surface of the ram.

5. The swaging tool of claim 1, wherein the bearing means of the ram includes a first annular bearing mounted around and movable with the ram in sliding engagement with the interior surface of the housing and wherein the bearing means of the first end portion of the stabilizing pin includes a second annular bearing mounted around and moveable with the first end portion of the stabilizing pin in sliding engagement with the interior surface of the housing.

6. The swaging tool of claim 1, wherein the second end portion of the housing is capless.

7. The swaging tool of claim 1, wherein the ram is tiered and includes a first portion and a second portion, and wherein the first portion of the ram has a radially disposed annular surface and the second portion of the ram includes an exterior surface spaced from the interior surface of the housing for receiving the bearing means of the ram therebetween.

8. The swaging tool of claim 7, wherein the piston has a first radially disposed annular surface in contacting alignment with the radially disposed annular surface of the ram.

9. The swaging tool of claim 8, wherein the first end portion of the stabilizing pin is enlarged to define an annular shoulder that engages a second radially disposed annular surface of the piston.

10. The swaging tool of claim 9, wherein the bearing means of the ram includes a first annular bearing located around and moveable with the exterior surface of the second portion of the ram in sliding engagement with the interior surface of the housing and wherein the bearing means of the first end portion and the stabilizing pin includes a second annular bearing located around and moveable with the first end portion of the stabilizing pin in sliding engagement with the interior surface of the housing.

11. The swaging tool of claim 10, further comprising plug means for closing the first end of the housing and a spring located between the plug means and the stabilizing pin, urging the stabilizing pin toward the second end of the housing.

12. The swaging tool of claim 1, further comprising plug means for closing the first end of the housing and a spring located between the plug means and the stabilizing pin, urging the stabilizing pin toward the second end of the housing.

13. The swaging tool of claim 1, further comprising interchangeable adapter means secured to the first and second jaw units for engaging a fitting to be swaged.

14. A swaging system for joining two tubes together, the swaging system comprising:

a fitting having a sleeve for receiving the tubes and a swaging ring, the swaging ring axially moveable over the sleeve to cause the ring to apply a radial force to the sleeve to thereby swage the sleeve to one of the tubes;

a swaging tool including a tubular housing having a first end, a second end, an interior surface, a first end portion that is open at the first end, a second end portion at the second end defining a closed cylinder having a port for receiving pressurized fluid, and a middle portion between the end portions, a first jaw unit on the first end portion of the housing to engage one of the swaging ring or the sleeve of the fitting and to restrain said one of the swaging ring or the sleeve from axial movement, a ram movable in opposite axial directions in the cylinder of the second end portion of the housing, the ram having an interior surface defining a bore, a piston movable in opposite axial directions in the middle portion of the housing and into engagement with the ram, the piston having an interior surface, a second jaw unit on the piston to engage the other of the ring or the sleeve of the fitting and to move said other of the swaging ring or the sleeve toward the first jaw unit upon movement of the piston in a first axial direction within the housing, a stabilizing pin slidably received through the piston and into the bore of the ram, the stabilizing pin having a first end portion located between the first end of the housing and the piston and an elongated portion having an exterior surface engaging the interior surfaces of the ram and the piston, and the ram and the first end portion of the stabilizing pin each having bearing means for reacting moments generated by the second jaw unit during swaging directly into the housing, and a source of hydraulic pressure secured to the port for pressurizing the closed cylinder of the housing.

* * * * *